(12) United States Patent
Read

(10) Patent No.: US 8,297,198 B2
(45) Date of Patent: Oct. 30, 2012

(54) HYDRAULIC-ELECTRIC REGENERATIVE ENERGY STORAGE SYSTEM

(75) Inventor: David H. Read, Dexter, MI (US)

(73) Assignee: The United States of America, as represented by the Administrator of the U.S. Environmental Protection Agency, Washington, DC (US)

( * ) Notice: Subject to any disclaimer, the term of this patent is extended or adjusted under 35 U.S.C. 154(b) by 367 days.

(21) Appl. No.: 12/711,603

(22) Filed: Feb. 24, 2010

(65) Prior Publication Data

US 2010/0151989 A1 Jun. 17, 2010

Related U.S. Application Data

(63) Continuation-in-part of application No. 11/807,405, filed on May 29, 2007, now abandoned.

(60) Provisional application No. 61/274,138, filed on Aug. 13, 2009.

(51) Int. Cl.
*B61C 3/00* (2006.01)

(52) U.S. Cl. ......... 105/35; 105/26.05; 105/65; 104/289; 104/154; 180/165

(58) Field of Classification Search .................. 104/289, 104/154; 105/35, 65; 180/305, 306, 165; 290/40 C, 40 B, 40 R, 1 A
See application file for complete search history.

(56) References Cited

U.S. PATENT DOCUMENTS

| | | | | |
|---|---|---|---|---|
| 4,086,856 A * | 5/1978 | Chenoweth | ..................... | 105/1.4 |
| 4,095,147 A * | 6/1978 | Mountz | ............................ | 318/52 |
| 5,473,990 A * | 12/1995 | Anderson et al. | ................ | 104/85 |
| 5,492,189 A * | 2/1996 | Kriegler et al. | ............ | 180/65.23 |
| 5,495,912 A * | 3/1996 | Gray et al. | ...................... | 180/165 |
| 5,623,878 A * | 4/1997 | Baxter et al. | ..................... | 104/85 |
| 5,735,215 A * | 4/1998 | Tegeler | .......................... | 105/34.1 |
| 5,909,710 A * | 6/1999 | Cummins | ..................... | 104/23.2 |
| 6,170,587 B1 * | 1/2001 | Bullock | ........................ | 180/69.6 |
| 6,267,062 B1 * | 7/2001 | Hamilton, Jr. | .............. | 105/26.05 |
| 6,719,080 B1 * | 4/2004 | Gray, Jr. | ........................ | 180/165 |
| 7,137,344 B2 * | 11/2006 | Kumar et al. | .................... | 105/35 |
| 7,147,078 B2 * | 12/2006 | Teslak et al. | ................... | 180/305 |
| 7,702,432 B2 * | 4/2010 | Bandai et al. | .................... | 701/22 |
| 2004/0251067 A1 * | 12/2004 | Gray et al. | ...................... | 180/165 |
| 2005/0039630 A1 * | 2/2005 | Kumar et al. | .................... | 105/35 |
| 2005/0194054 A1 * | 9/2005 | Moskalik et al. | ............... | 138/31 |
| 2006/0102394 A1 * | 5/2006 | Oliver | ........................... | 180/65.2 |
| 2007/0272116 A1 * | 11/2007 | Bartley et al. | .................... | 105/35 |
| 2007/0278027 A1 * | 12/2007 | Gray et al. | ...................... | 180/165 |
| 2008/0000381 A1 * | 1/2008 | Bartley et al. | .................... | 105/49 |
| 2008/0083576 A1 * | 4/2008 | Read | .............................. | 180/165 |
| 2008/0121136 A1 * | 5/2008 | Mari et al. | ....................... | 105/35 |
| 2008/0148993 A1 * | 6/2008 | Mack | ............................... | 105/35 |
| 2010/0151989 A1 * | 6/2010 | Read | ................................. | 477/4 |
| 2010/0282122 A1 * | 11/2010 | Mai | ................................ | 105/1.4 |

* cited by examiner

*Primary Examiner* — Jason C Smith
(74) *Attorney, Agent, or Firm* — David H. Read

(57) ABSTRACT

A hydraulic energy storage system (comprising a hydraulic pump/motor, a high pressure hydraulic accumulator, a low pressure hydraulic accumulator/reservoir, and interconnecting hydraulic lines) is incorporated into a EV, HEV, or PHEV to provide hydraulic regenerative braking and propulsive assistance for the vehicle. Implementation of the low cost and long-lasting hydraulic energy storage system in the vehicle, together with the electric energy storage system (comprising a motor/generator and battery pack) of the vehicle, allows significantly reduced demands and higher operating efficiencies for the battery pack, thereby facilitating a more cost-effective, efficient and/or durable overall energy storage system for the vehicle.

1 Claim, 8 Drawing Sheets

HYDRAULIC-ELECTRIC REGENERATIVE ENERGY STORAGE SYSTEM

CROSS-REFERENCE TO RELATED APPLICATIONS

This application is a continuation-in-part of U.S. patent application Ser. No. 11/807,405 "Regenerative Energy Storage System for Hybrid Locomotive," filed May 29, 2007 now abandoned, and also claims priority from U.S. Provisional Patent Application 61/274,138, "Hydraulically Assisted Plug-In Hybrid Electric Vehicle," filed Aug. 13, 2009.

BACKGROUND OF THE INVENTION

1. Field of the Invention

This invention relates to regenerative braking and energy storage systems for motor vehicles.

2. Description of the Related Art

Electric vehicles (EVs), hybrid electric vehicles (HEVs), and plug-in hybrid electric vehicles (PHEVs) provide highly desirable benefits in being able to reduce consumption of liquid transportation fuels. However, industry has not yet found a battery technology that is sufficiently low cost and durable to achieve widespread commercialization and consumer acceptance of these vehicles without large subsidies.

The predominate Nickel Metal Hydride (NiMH) and Lithium Ion (Li-Ion) battery technologies cost $500 to $1000 or more per kilowatt-hour of energy storage capability. As a result, for a hypothetical EV or PHEV sedan with a 16 kilowatt-hour lithium ion battery pack for a 40-mile or more electric-powered range, the battery pack alone could add $16,000 to the cost of the vehicle, thereby significantly limiting the potential market for the vehicle. For a larger, commercial vehicle, the battery pack can cost two to five times more, affecting the potential market for larger vehicles as well. In addition, NiMH and Li-Ion batteries face potential resource constraints for the metals necessary for the batteries in the event of widespread deployment, which may further increase costs or reduce availability. Cooling costs and concerns to avoid overheating of the batteries is also a challenge. Significant technology breakthroughs are needed for NiMH and Li-Ion batteries to meet the demand for a commercially viable EV or PHEV at a reasonable cost.

In contrast, lower cost traditional lead-acid batteries cost closer to $100 per kilowatt-hour of energy storage capability. However, traditional lead-acid batteries have a much lower cycle life (e.g., less than 1000 cycles unless the depth of discharge is significantly limited to extend life). As a result, an EV or PHEV with a lead-acid battery pack would be expected to need battery replacement after just 2-3 years unless the all-electric range is dramatically limited to maintain battery life. In addition, traditional lead acid batteries use a large quantity of lead, which must be managed to reduce harmful environmental effects.

Lead acid batteries are also larger and heavier than NiMH and Li-Ion batteries for the same amount of energy storage, thereby presenting packaging challenges and escalating weight-related costs as the battery pack increases in size and weight (e.g, at some point, the battery weight necessitates greater structural support for the vehicle, which means even greater vehicle weight, all of which increases cost and the amount of energy needed to move the vehicle, therefore offsetting fuel efficiency gains for an HEV or PHEV; and fitting the battery pack within a vehicle without significantly reducing cargo or passenger space becomes difficult). Industry has therefore turned away from lead acid batteries as a technology for future EVs and PHEVs, particularly PHEVs with a significant engine-off range (e.g., a range of about 20 miles or more, and battery packs of around 12 or more kilowatt-hours).

As alternatives, two small companies, Firefly Energy and Axion Power, have developed advanced lead-acid batteries with a greater cycle life (e.g., about 2000 cycles at a 60% depth of discharge for Firefly, and about 1600 deep-discharge cycles for Axion Power), and with a lighter weight (and much less lead content for Firefly) than traditional lead-acid batteries, albeit at a cost premium above other lead acid batteries (but still potentially less than one-half the cost of Li-Ion batteries). However, the cycle life for these advanced lead acid batteries remains insufficient for the expected life of a motor vehicle. For purposes of this application, the term "lead acid batteries" as used hereafter encompasses traditional lead acid batteries and advanced lead acid battery technologies such as Firefly's and Axion Power's, unless otherwise specified.

Therefore, there remains a desperate need in the art for a cost-effective and durable energy storage system for EVs and PHEVs.

Furthermore, while many electric storage batteries can have "optimal" charging efficiencies (defined herein as a battery charging efficiency of 80% or more) during regenerative braking for very light braking events (and high discharge efficiencies for very light electric-powered acceleration events), it has been found that average charging efficiencies in normal vehicle braking are much lower, due in part to charging the battery at higher than optimal charging rates in order to help meet driver braking power demands. For example, a sample battery may have an 85% "roundtrip" efficiency (taking into account both the charging efficiency and the discharging efficiency) at a small charge/discharge current X, an 80% roundtrip efficiency at a charge/discharge current 2X, a 70% roundtrip efficiency at a charge/discharge current 4X, 60% roundtrip efficiency at current 8X, 50% roundtrip efficiency at current 12X, and 40% roundtrip efficiency at a charge/discharge current 16X. See, e.g., Yufang Li, et. al, "An Analysis of Electric Assist Control Strategy for Hybrid Electric Vehicles and Simulation," Journal of Asian Electric Vehicles, Vol. 2, No. 1, pp. 527-529, FIG. 5 (2004).

Therefore, there remains a desperate need in the art for a more cost-effective and efficient way to capture and store braking energy in an EV, HEV, or PHEV.

OBJECT OF THE INVENTION

One object of the invention is to provide a cost-effective energy storage system for plug-in hybrid electric motor vehicles.

A further object of the invention to provide an improved regenerative braking and energy storage system for motor vehicles.

SUMMARY OF THE INVENTION

A hydraulic energy storage system (comprising a hydraulic pump/motor, a high pressure hydraulic accumulator, a low pressure hydraulic accumulator/reservoir, and interconnecting hydraulic lines) is incorporated into a EV, HEV, or PHEV to provide hydraulic regenerative braking and propulsive assistance for the vehicle. Implementation of a low cost and long-lasting hydraulic energy storage system in the vehicle allows significantly reduced demands on the vehicle's electric storage battery pack, thereby facilitating a more cost-effective and/or durable overall energy storage system for the vehicle. Regenerative braking in the vehicle is managed to optimize efficiency in recharging the battery pack, and maximize recoverable energy, by preferentially charging the battery—but limited to an optimal efficient charging rate for the battery until the hydraulic energy storage system is full.

DETAILED DESCRIPTION OF THE INVENTION

It will be understood that inverters, switches, reduction gears, and various other components do not need to be shown or discussed for the embodiments discussed here to enable the making and using of the inventions herein, and thus such common features are omitted from the description for purposes of simplicity and better focus on the essential elements of the invention.

Figure 1:
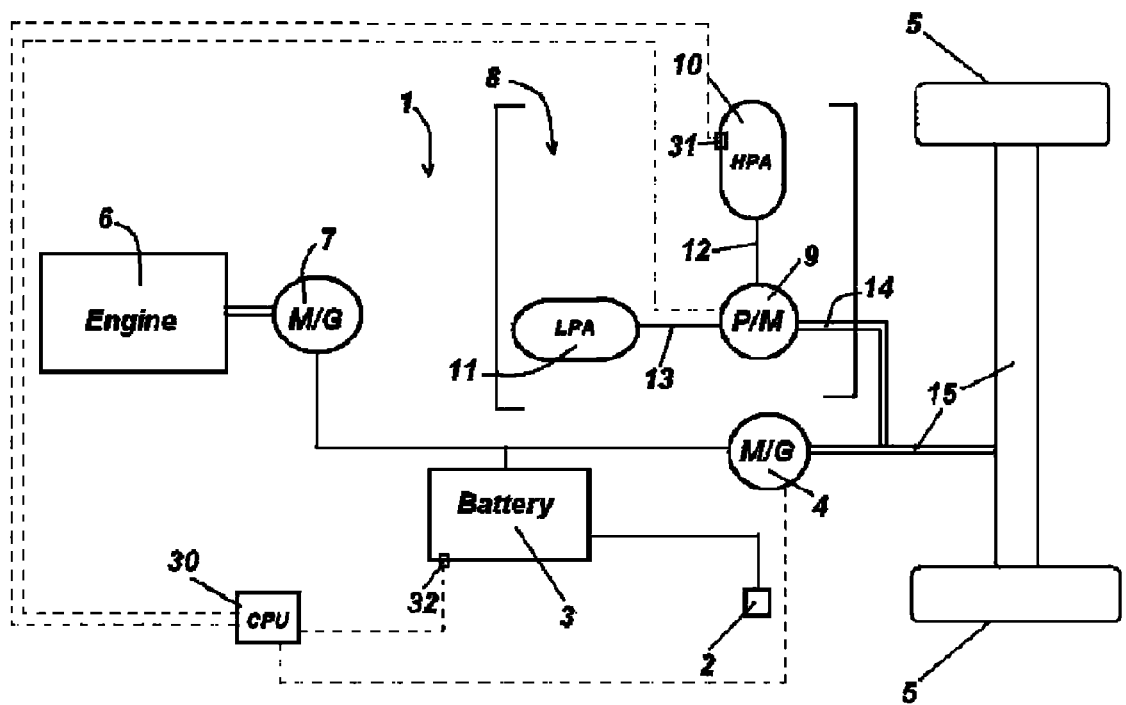
FIG. 1 presents a schematic drawing of one embodiment for a motor vehicle of the present invention.

FIG. 1 presents a schematic drawing of a powertrain for one embodiment of a motor vehicle of the present invention. Referring to FIG. 1, plug-in hybrid vehicle 1 includes an electrical outlet 2 for charging of on-board vehicle battery pack 3. As is known in the art, the presence of electrical outlet 2 on the vehicle facilitates charging of the battery pack 3 at homes, offices, or other charging places, thereby allowing the vehicle to be run in large part from energy generated from stationary sources instead of from liquid transportation fuels on board the vehicle. Vehicle 1 may be propelled by battery 3 sending electricity to run electric motor 4 as a motor to propel drive wheels 5.

In order to provide unlimited range for vehicle 1 in the event of depletion in the state of charge (SOC) in battery 3 down to a specified minimum threshold, an internal combustion engine 6 operates, as necessary, to drive an electric motor/generator 7 as a generator. Electricity generated by motor/generator 7 may then be sent (a) to drive electric motor 4 as a motor to provide motive power to the vehicle drive wheels 5, or (b) to battery pack 3 for energy storage and later reuse, or (c) to both purposes.

A hydraulic energy storage system 8 is also located on board vehicle 1, comprising hydraulic pump/motor 9, high pressure hydraulic accumulator 10, low pressure hydraulic accumulator 11, high pressure fluid line 12, low pressure fluid line 13, and pump/motor drive shaft 14. Hydraulic energy storage system 8 provides regenerative braking or propulsive assistance, as needed, to vehicle 1.

For regenerative braking through the hydraulic energy storage system 8, kinetic energy of vehicle 1 is transmitted from vehicle wheels 5 through mechanical linkages 15 to drive shaft 14 (e.g, through gears, belts, or other power take-off mechanisms known in the art for diverting a portion of mechanical power) to rotationally drive hydraulic pump/motor 9 as a pump, and thereby take low pressure fluid from line 13, pump the fluid to a higher pressure, and expel the high pressure fluid to fluid line 12 and high pressure accumulator 10. High pressure accumulator 10 receives and stores the pressurized fluid against a compressed gas for energy storage. Sample high pressure hydraulic accumulators are disclosed in greater detail in U.S. Pat. Nos. 7,121,304 and 7,108,016, which patents are incorporated herein by reference. Low pressure accumulator 11 provides a reservoir for the low pressure hydraulic fluid.

For propulsive assistance from the hydraulic energy storage system 8, high pressure fluid from high pressure accumulator 10 is released through fluid line 12 to drive pump/motor 9 as a hydraulic motor, thereby driving rotation of shaft 14, which is mechanically transmitted through mechanical linkages 15 to drive the vehicle wheels 5. Mechanical linkages 15 may comprise such typical drivetrain components as a driveshaft, gearing, differential, and axle. Low pressure accumulator 11 provides a reservoir for the hydraulic fluid after de-pressurization in hydraulic motor 9. The functions of hydraulic pump/motor 9 could also be performed by the combination of a separate hydraulic pump and a hydraulic motor, if desired, as will be readily understood in the art.

Regenerative braking may also be done electrically, with electric motor 4 operating as a generator driven by the drive wheels 5 through mechanical linkages 15 to generate electrical energy for storage in battery pack 3. It will be noted that the representations in FIG. 1 of shaft 14 and mechanical linkages 15 are just one sample representation of ways to transfer mechanical power to or from the conversion devices (i.e, the pump/motor 9 and/or motor/generator 4) and the drive wheels 5, and are not intended to be limiting. Either conversion device may be separated, or not, from the rotation of drive wheels 5 by gearing, belts, transmissions, or other devices for transmitting mechanical power. Indeed, the conversion devices could be placed directly in the hubs of the drive wheels 5, if desired.

For purposes of this application, EVs, HEVs and PHEVs that have a hydraulic energy storage system incorporated therein may be referred to at times under the general term "hydraulic-electric hybrid motor vehicles."

The addition of the hydraulic energy storage system 8 to a PHEV, as in the embodiment of FIG. 1, facilitates various ways to improve the cost-effectiveness, efficiency, and commercial viability of PHEVs. Some of these ways will be described below. While the examples provided below use for a baseline comparison a 40-mile range PHEV sedan with a 16 kilowatt-hour Li-Ion battery pack, comparable benefits of varying magnitude could be obtained with EVs, HEVs, and PHEVs of other vehicle sizes and other desired engine-off ranges.

As a first example, the hydraulic energy storage system 8 may be used to extend the engine-off range of a PHEV. For instance, a PHEV sedan with a 16 kilowatt-hour Li-Ion battery pack would generally provide about 40 miles of engine-off range before needing recharging of the battery pack. Through addition of the hydraulic energy storage system 8 with small hydraulic accumulators (e.g., 5-10 gallon for easier packaging on a PHEV, as opposed to 20+ gallon sized accumulators on current series hydraulic hybrid prototype vehicles), and use of the hydraulic system for most regenerative braking and initial acceleration versus electric operation, engine-off range of the vehicle could be extended to about 50 miles or more, with an additional incremental cost of $1000 or less.

As a second (alternative) example, the hydraulic energy storage system 8 may be used instead to maintain the same engine-off range of the PHEV, but with a smaller Li-Ion or NiMH battery pack. For instance, again through addition of the hydraulic energy storage system 8 with small (e.g., 5 gallon) accumulators, and use of the hydraulic system for most regenerative braking and initial acceleration versus electric operation, it is estimated an engine-off range of 40 miles could be maintained for the vehicle with a smaller Li-Ion battery pack, of perhaps 12 kilowatt-hours, for a few thousand dollars in cost savings over a PHEV with a 16 kilowatt-hour battery pack.

As a third (alternative) example, the hydraulic energy storage system 8 may be used instead to maintain the same engine-off range of the PHEV for the life of the vehicle, but with a less expensive advanced lead acid battery pack (such as by Firefly or Axion Power). For instance, again through addition of the hydraulic energy storage system 8 with relatively small accumulators, and use of the hydraulic system for most regenerative braking and initial acceleration versus electric operation, it is estimated an engine-off range of 40 miles could be maintained for the vehicle using a 16 kilowatt-hour advanced lead acid battery pack, but with less depth of discharge than would otherwise be necessary, to extend the cycle life for the battery. In other words, depth of discharge for the battery pack could be limited to a set level (e.g., to 50% SOC) as determined to ensure sufficient life expectancy for the battery. The ability to use the less expensive battery technology for equivalent performance benefits could result in several thousand dollars in cost savings over a comparable PHEV with a 16 kw-hr Li-Ion battery pack.

Figure 2:
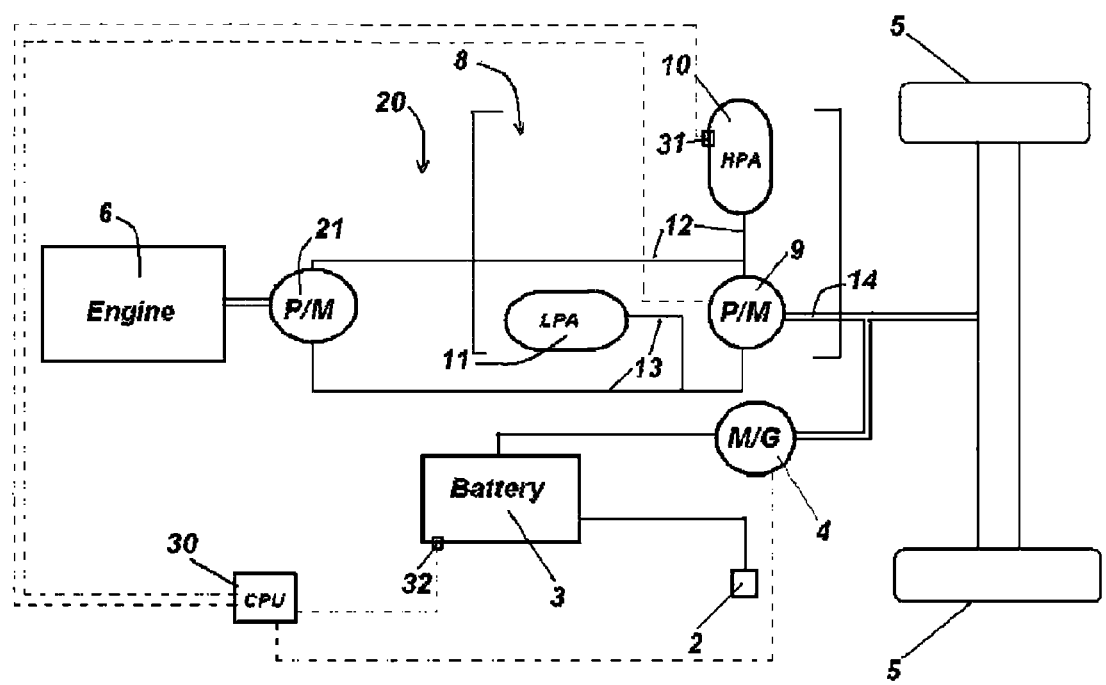
FIG. 2 presents a schematic drawing of a second embodiment for a motor vehicle of the present invention.

Referring now to FIG. 2, a second embodiment of a motor vehicle of the present invention is provided as vehicle 20. Similar to vehicle 1 of FIG. 1, vehicle 20 of FIG. 2 includes an electrical outlet 2 for charging battery pack 3 of the vehicle, and the vehicle 20 may be propelled by battery pack 3 sending electricity to electric motor 4 to drive the wheels 5. Vehicle 20 therefore again provides plug-in electric vehicle operation. A hydraulic energy storage system 8 (with high pressure accumulator 10, low pressure accumulator 11, hydraulic pump/motor 9, high and low pressure fluid lines, etc) is also again provided, allowing regenerative braking and propulsive assistance for the vehicle as needed through pump/motor 9. However, in contrast to FIG. 1, engine 6 drives a hydraulic pump 21 instead of motor/generator 7, and unlimited range for the vehicle 20 is provided through series hydraulic operation instead of series electric operation. In other words, engine 6 may drive hydraulic pump 21 to pressurize fluid that may be sent to (a) hydraulic pump/motor 9 to drive pump/motor 9 as a motor to propel the vehicle, or (b) to the high pressure accumulator for energy storage and later reuse, or (c) both.

The motor vehicle embodiment provided in FIG. 2 could be described as a series hydraulic hybrid vehicle with plug-in extended electric range capability. One benefit of the configuration in FIG. 2 is that it makes the battery pack 3 expendable and unnecessary for satisfactory vehicle operation. Given the durability concerns and high costs of battery packs for PHEVs, it may be desirable for a vehicle to be able to continue to operate satisfactorily without needing costly replacement of the battery pack in the event of a battery pack failing or reaching the end of its useful life. For example, while NiMH and Li-Ion battery packs are expected to last at least 8-10 years in operation, motor vehicles can last much longer than that, and battery replacement would cost several thousand dollars at least (which at that point may cost more than the value of the vehicle itself). With the vehicle 20 of FIG. 2, the battery pack 3 could be removed (if desired) and the vehicle would operate satisfactorily as a series hydraulic hybrid vehicle. In addition, a smaller and/or less expensive battery pack could alternatively replace battery pack 3 and remain for continued vehicle operation as a PHEV for the limited remaining life of the vehicle, or simply to provide engine-off electrical power for accessory operation in the vehicle.

Figure 3:
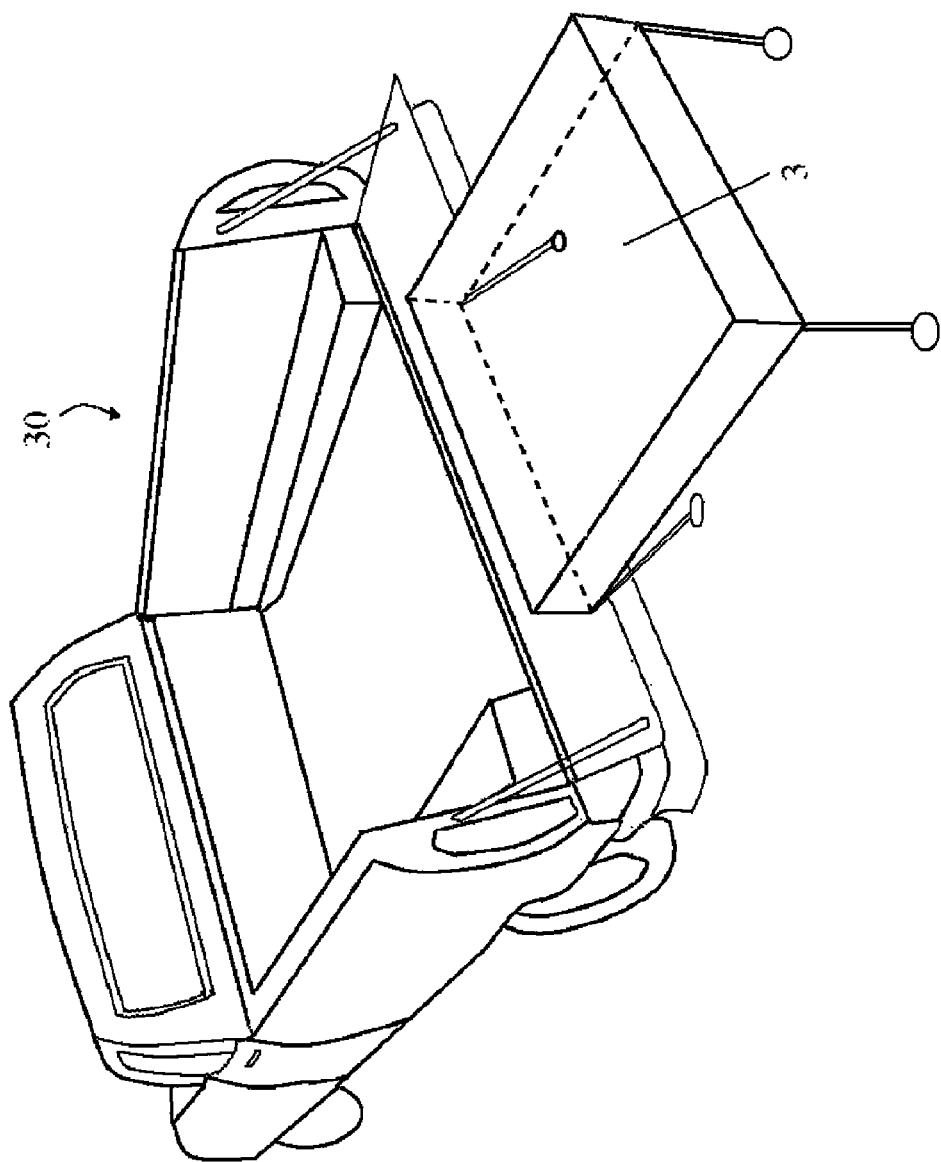
FIG. 3 illustrates a sample battery pack removal system for the motor vehicle embodiments of the present invention.

A mechanism for easy removal of the large battery pack 3 may be provided. For example, referring to FIG. 3, for a PHEV pick-up truck 30, the battery pack 3 could be configured to lay flat in the back of the pick-up truck, with a means provided for easily sliding the battery pack into and out of the vehicle. These means for sliding (or rolling) the battery pack into and out of the vehicle without heavy lifting could include rollers integrated on the truck (e.g., on the truck bed) or on the bottom of the battery pack, lubricated or slippery surfaces for easy sliding, collapsible legs with rollers (like a cart, to support the battery pack weight) as illustrated in FIG. 3 (plug-in connections for battery pack to vehicle not depicted), or various other means. Similar arrangements could be provided on or under the vehicle floor for minivans, SUVs, commercial vehicles, etc. Even without a failure of the battery pack, occasional removal of the battery pack may be desirable for HEVs and PHEVs (e.g., to increase cargo space, or in situations where the weight of the battery pack will cause a net loss in efficiency, such as for long trips that will significantly exceed the engine-off range, or for PHEV operation where recharging stations will not be available, or where the climate may be inhospitable for the battery).

Likewise, easier battery pack removal would facilitate maintenance and/or adjusting the battery pack size, type, or capacity if desired; for example, for an urban driver who generally recharges at intervals of less than 20 miles, it would be cost-effective for the driver to only carry battery capacity for a 20-mile range instead of a 40-mile range. Customer-specific optimization of battery pack size to fit the customer's driving patterns may be facilitated by providing the battery packs in easily separable packs or modules. At the point of sale, this could allow a consumer to choose the appropriate battery pack (and corresponding engine-off range) at various price points. It also allows the consumer to add or subtract battery pack modules as desired, e.g., as her driving patterns change or for transfers of the vehicle to a new driver. As battery packs for hybrid vehicles are already made with multiple discrete cells, providing a battery pack in packs or modules that are easily separable by a consumer is well within the skill in the art and does not need to be explained further here.

The United States Government and other government entities have enacted generous tax credits and other incentives to encourage purchases of PHEVs, EVs and HEVs. For example, current US tax credits for plug-in hybrid vehicles are calculated at $2500 plus $417 for each kilowatt hour of battery capacity above 4 kilowatt-hours, up to a maximum of $7500 for vehicles with a gross vehicle weight rating of less than 10,000 lbs. The US tax credits are not restricted to a particular battery technology, battery performance, or durability standard. As a result, the opportunity exists for a PHEV with lead acid battery technology (with an incremental cost of about $100 per kilowatt-hour, or perhaps twice that for Firefly's or Axion Power's advanced lead acid batteries) to actually cost less than a conventional non-PHEV vehicle, once tax credits are figured in. Under such a scenario, the vehicle of FIG. 2 would be particularly attractive, as a hypothetical PHEV with 16 kilowatt-hours of lead acid batteries would cost several thousand dollars less than a conventional vehicle (after the $7500 tax credit) and perhaps $10,000 less than a Li-Ion PHEV, and provide 40-mile engine-off range for 3 to 6 years (or a lesser range for a longer period of time, using charge-sustaining methods to increase cycle life), at which point the battery pack could either be replaced or disposed of entirely in existing lead acid storage battery recycling locations. In the event of disposal of the battery, the vehicle would thereafter remain functional as a series hydraulic hybrid vehicle. This provides an attractive cost/benefit proposition for the consumer.

In addition, although lead acid batteries weigh more than their NiMH or Li-Ion counterparts, the large cost difference in the battery pack could enable use of higher cost but weight saving efforts elsewhere for the vehicle to offset the weight gain (e.g., replacing some of the steel in the vehicle structure and components with lighter weight materials such as carbon fiber, compacted graphite, or aluminum).

The inclusion of both a hydraulic energy storage system and an electric storage system (e.g., the battery pack 3 and motor/generator 4 in FIGS. 1 and 2) on an EV, HEV, or PHEV further allows an additional method for improving the cost-effectiveness and efficiency of the motor vehicle, through optimal management of the regenerative braking in the vehicle. As mentioned before, the battery charging efficiencies in regenerative braking in EVs, HEVs, and PHEVs suffer in part from the need to charge the battery at higher than optimal charging rates (in order to help meet driver braking power demands without simply wasting the potentially recoverable energy by resorting to friction braking) Thus, while a sample battery may have an 85% roundtrip efficiency at a small charge/discharge current X and an 80% roundtrip efficiency at a charge/discharge current 2X that efficiency quickly declines to a 60% roundtrip efficiency at a charge/discharge current 8X, 50% at current 12X, and 40% at current 16X, etc. With a hydraulic energy storage system on board the vehicle and also available for regenerative braking, the need to charge the battery pack at high charge rates may be minimized, and the overall efficiency in regenerative braking may be improved. A good hydraulic energy storage system can perform regenerative braking at 90+% efficiency.

While the hydraulic energy storage system is expected to recapture energy in braking at a higher efficiency than the electric storage system, it may nevertheless be desirable to preferentially regenerate the electric storage system in braking, at least up to a predefined efficient charging rate for the battery pack 3. For example, referring to FIG. 4A, in sample braking events B1 and B2, braking is preferentially performed by the electric system (i.e., driving motor/generator 4 as a generator to charge battery 3 and thereby cause slowing of the vehicle, as described above) up to a certain level of braking power in which electric braking can be performed at a high regenerative efficiency. For a very light braking event such as B1, this will result in the braking event being handled solely through electric regenerative braking. However, for heavier braking demands such as for braking event B2, whatever additional braking power is needed to meet the desired braking demand will be supplied through hydraulic regenerative braking (i.e., driving pump/motor 9 as a pump to slow the vehicle and pressurize fluid for storage in the high pressure accumulator 10, as described above).

Figure 4A:
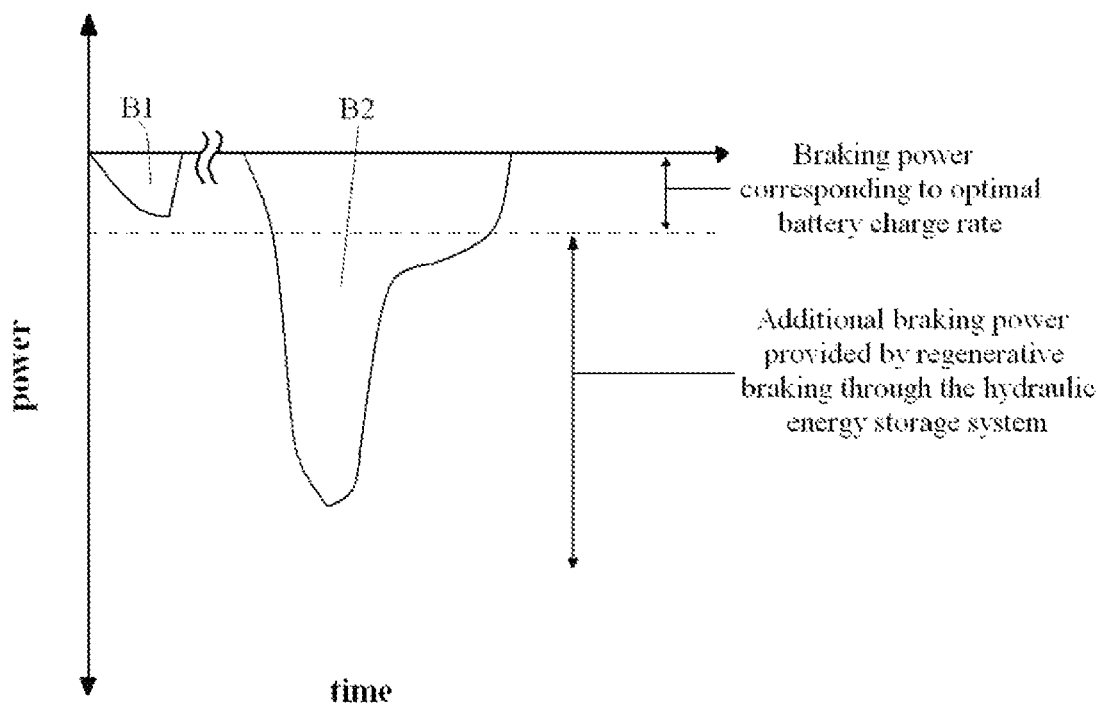
FIG. 4A depicts apportionment of regenerative braking between the hydraulic and electric energy storage systems during a sample braking event, according to one embodiment of the invention.
Figure 4B:
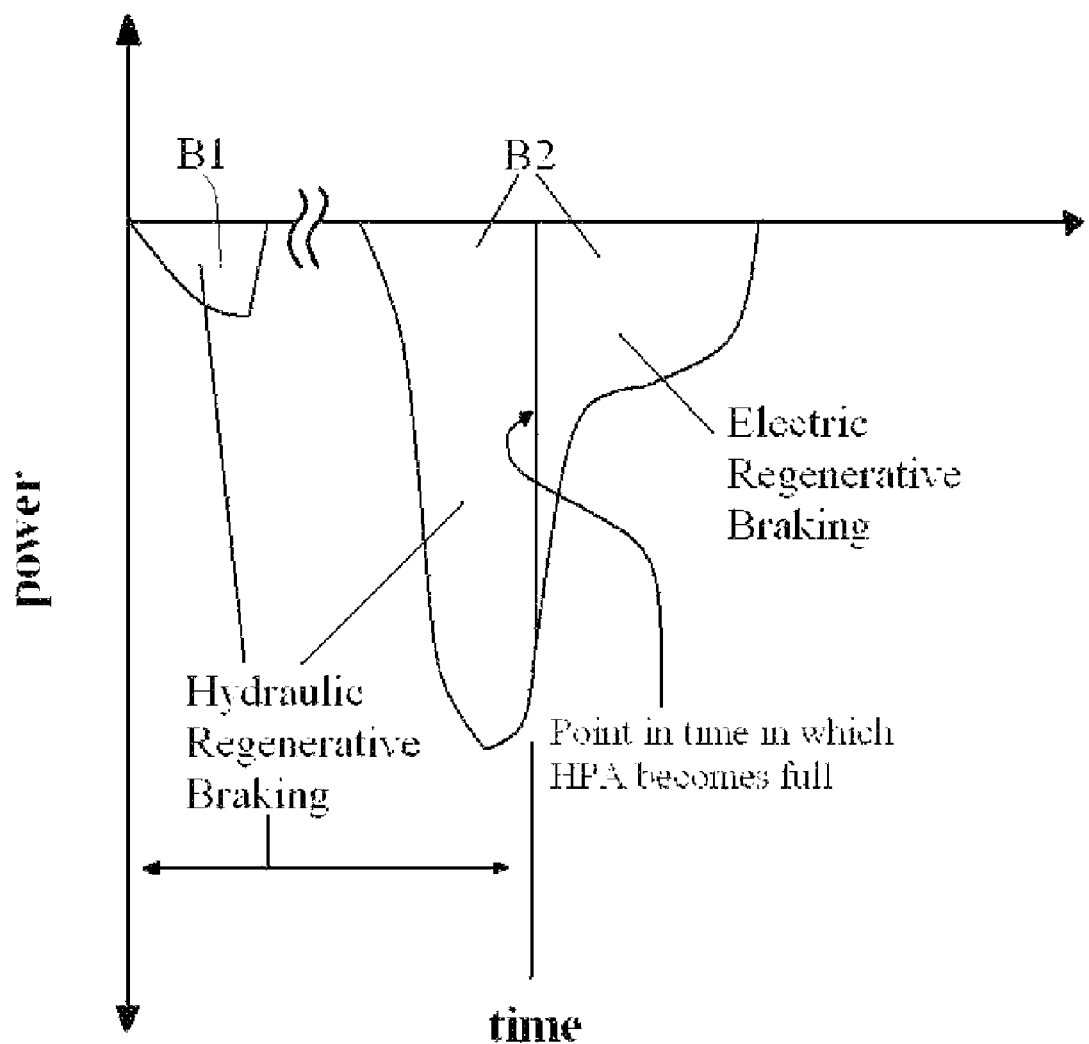
FIG. 4B depicts apportionment of regenerative braking between the hydraulic and electric energy storage systems during a sample braking event, according to a second, alternative, embodiment of the invention.

The braking method depicted above and in FIG. 4A can improve overall energy storage in braking, particularly for vehicles that can only fit smaller than optimal hydraulic accumulators due to packaging concerns. This can be seen by comparing FIG. 4A to an alternative braking method shown in FIG. 4B, in which hydraulic regenerative braking is used preferentially in an attempt to handle all vehicle braking demands. As can be seen in FIG. 4B, because hydraulic accumulators have very limited total energy storage capacity in comparison to electric batteries, it can be a common occurrence for the accumulators to reach their maximum energy storage capacity and be unable to capture more energy in a braking event (particularly for heavy or fast vehicles that can generate large amounts of energy in braking, or for vehicles using small accumulators). Thus, FIG. 4B shows that in such an event, where the accumulator reaches its predetermined maximum safe capacity, the remaining braking power in the braking event would be handled through electric regenerative braking (or, alternatively, friction braking). This would result in either a complete loss of the remaining energy (i.e., in friction braking) or in charging the battery at potentially very inefficient charging conditions. As mentioned above, the result would be that instead of charging the battery at an average optimal charging efficiency of 80%, 85%, or more when used, the charging efficiency could be significantly lower, thereby lowering the overall energy recovered and the efficiency of the vehicle.

Figure 5:
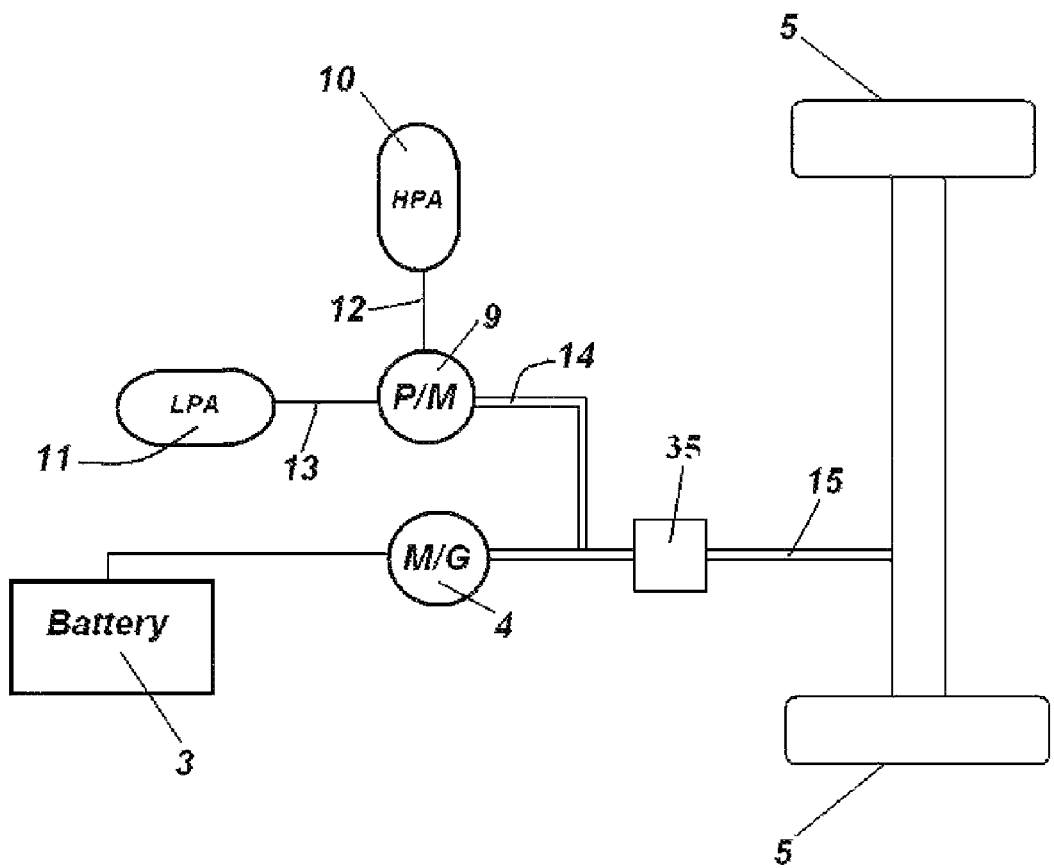
FIG. 5 presents a schematic drawing of an alternative embodiment of a regenerative energy storage system of the present invention.

There can be multiple ways to facilitate the limiting of the electric regenerative braking to an optimal charging rate (for battery charging efficiency or, alternatively, for maximum battery life and/or overall efficiency considering generator efficiencies and other considerations) while concurrently providing variable braking power through the hydraulic regenerative braking sufficient to together meet the overall braking demand. In one embodiment, schematically shown in FIG. 5, a continuously variable transmission (CVT) 35 is placed between motor/generator 4 and drive wheels 5. The regenerative braking system of FIG. 5 could fit with the vehicle powertrain embodiment of FIG. 1 or FIG. 2, so only the regenerative braking portion of the motor vehicle is presented in FIG. 5. In braking, the CVT 35 may be used to adjust speed ratios between the motor/generator's drive shaft 36 and the drive wheels 5 to provide a relatively constant speed (rpm) for drive shaft 36 and motor/generator 4, thereby facilitating a selection of optimal conditions (in terms of efficiency of motor/generator 4 and/or charging efficiency of battery 3) for charging battery 3 in braking Pump/motor 9 and its drive shaft 14 are also mechanically coupled to drive shaft 36 (or, alternatively, through a different mechanical shaft or device to mechanical linkages 15, on potentially either side of the CVT). Displacement of the pump/motor 9 may be varied to most efficiently handle the remaining braking power needed for the hydraulic regenerative braking system.

Figure 6A:
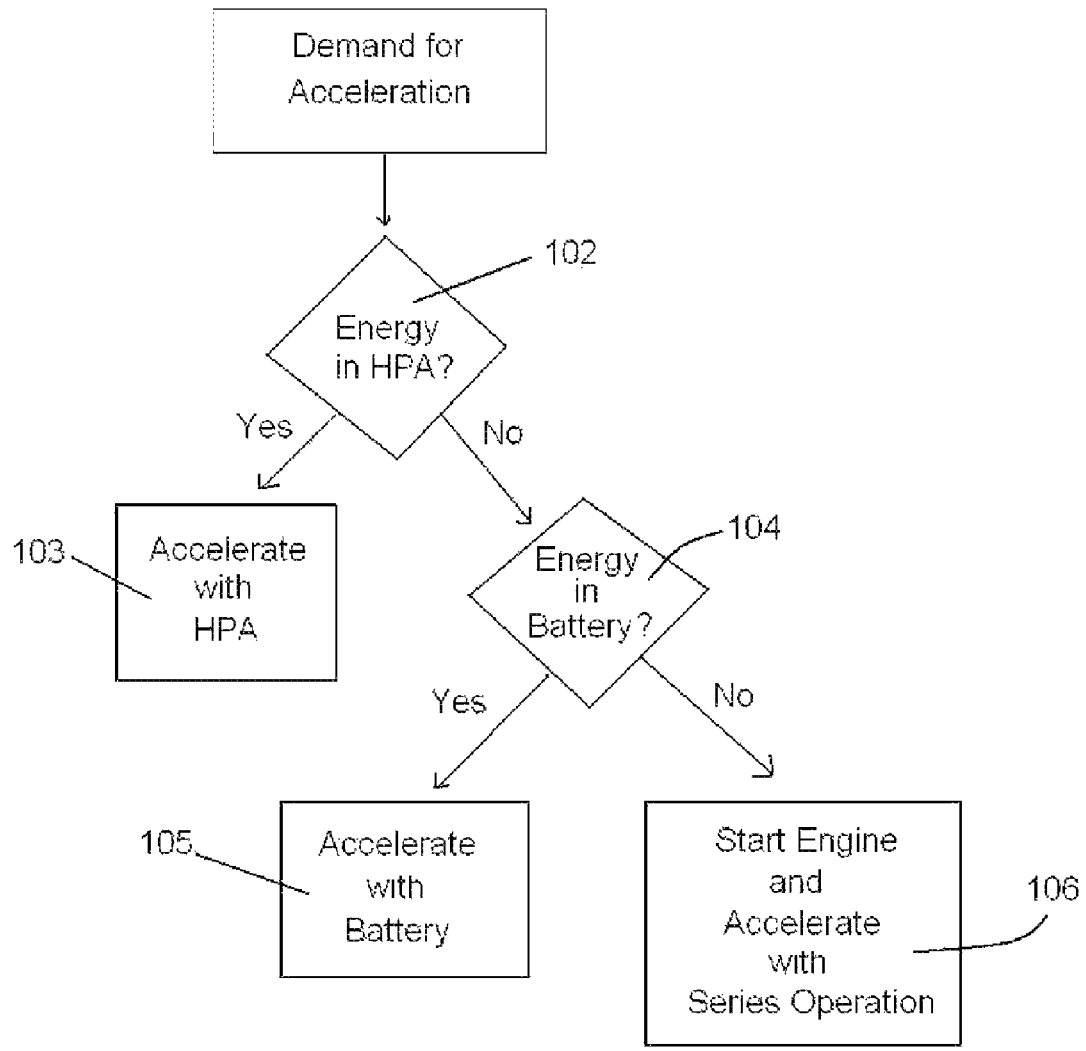
FIG. 6A presents a flow chart depicting a method of operation according to an embodiment of the present invention, related to a command for acceleration.
Figure 6B:
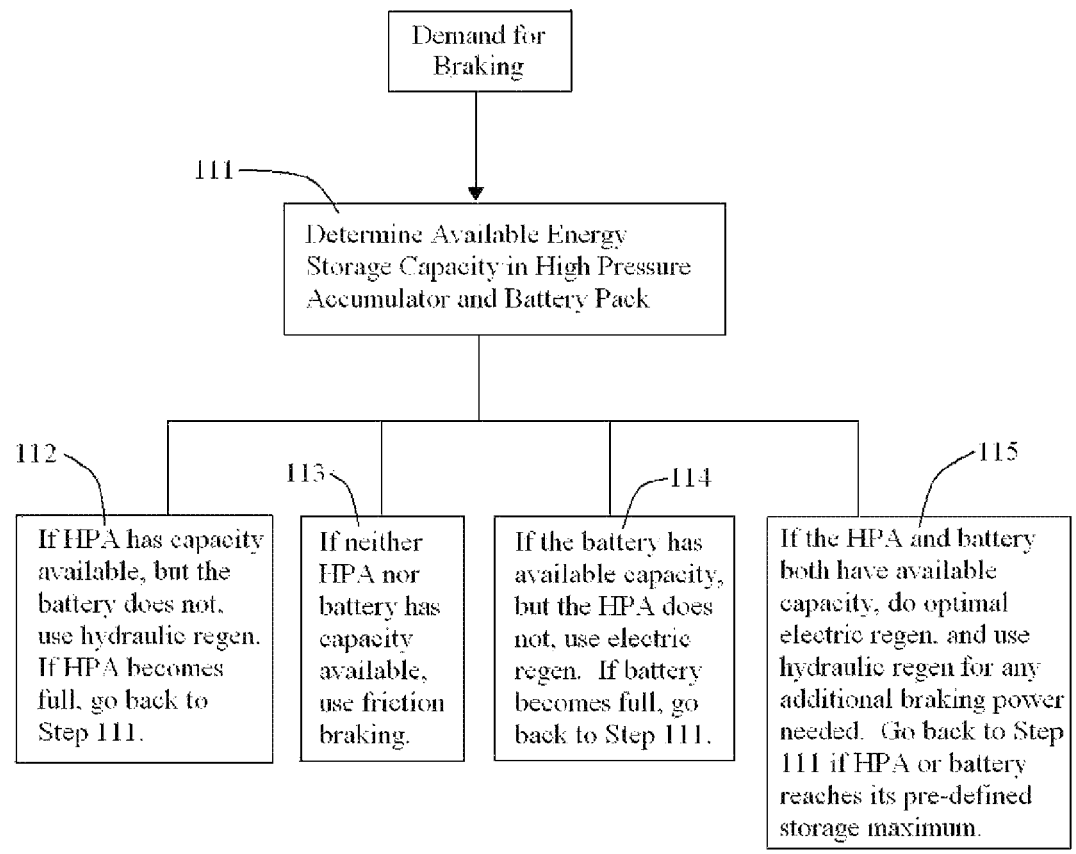
FIG. 6B presents a flow chart depicting a method of operation according to an embodiment of the present invention, related to a command for braking.

Referring now to FIGS. 6A and 6B, flow charts are provided to explain sample methods of operating the vehicles of the present invention. The methods herein may be incorporated into logic programmed into a vehicle controller 30 shown in FIG. 1 or 2.

Referring first to FIG. 6A, in the event of a demand for vehicle acceleration (i.e., the driver depresses the accelerator pedal), it is determined in step 102 whether energy storage in high pressure accumulator 10 exceeds a minimum threshold. This may be determined through a pressure sensor 31 configured to sense or determine pressure in high pressure accumulator 10 and/or high pressure fluid lines 12. In the event that fluid pressure exceeds the minimum threshold, the acceleration demand for the vehicle is met, in step 103, through controlling hydraulic motor 9 to operate as a motor to drive vehicle wheels 5 through drive shaft 14 and mechanical linkages 15. On the other hand, in the event that the fluid pressure in high pressure accumulator 10 does not exceed the minimum threshold, then it is determined in step 104 whether the state of charge (SOC) of battery 3 exceeds a minimum threshold. This may be determined through a remaining charge meter 32, or through other estimating or determining means as known in the art. In the event that the remaining charge in the battery 3 exceeds the minimum threshold, then in step 105 the acceleration demand for the vehicle is met through controlling electric motor 4 to operate as a motor (drawing power from the battery 3) to propel the vehicle. On the other hand, in the event that the battery SOC is not above the minimum threshold, in step 106 controller 30 will cause engine 6 to start in order to propel the vehicle through series operation (i.e., in a vehicle powertrain like FIG. 1, engine 6 will drive motor/generator 7 as a generator to generate electricity and drive electric motor 4 as a motor to propel the vehicle; in a vehicle powertrain like FIG. 2, engine 6 will drive pump/motor 21 as a pump to pressurize fluid to drive pump/motor 9 as a motor to propel the vehicle).

It should be noted that while sensors 31 and 32 are depicted as physically attached to high pressure accumulator 10 and battery 3, respectively, in the figures, such positioning is not necessary; similarly, as previously discussed, other sensors or calculation methods may be used to monitor battery and accumulator charge levels.

Referring next to FIG. 6B, in the event of a demand for braking (i.e., the driver depresses the brake pedal), it is determined in step 111 whether there is available energy storage capacity in high pressure accumulator 10 and in battery pack 3. This may be determined through a signal from pressure sensor 31 that relates to whether the pressure in high pressure accumulator 10 and/or high pressure fluid lines 12 exceeds a set upper threshold, and through a signal from remaining charge meter 32 that relates to whether the state of charge (SOC) exceeds a set upper threshold. If there is energy storage capacity still available in high pressure accumulator 10, but there is no energy storage capacity left in battery pack 3, then in step 112 pump/motor 9 is controlled to operate as a hydraulic pump, driven by mechanical connection to vehicle wheels 5, to pressurize fluid from low pressure accumulator 11 for storage in high pressure accumulator 10. This will provide braking to the vehicle. In the event it is determined that the high pressure accumulator has become full and no longer has available energy storage capacity, the vehicle will then switch to friction braking (step 113) to meet the braking demand (e.g., by proceeding directly to step 113 or by returning to step 111 for a re-determination that will result in proceeding to step 113).

In a second case, in the event it is determined in step 111 that further energy storage is neither available in the high pressure accumulator 10 nor battery pack 3, then the vehicle will proceed to step 113 and apply friction braking to meet the vehicle braking demand.

If it is determined in step 111 that there is available energy storage capacity in battery pack 3 but no available energy storage capacity in high pressure accumulator 10, then control will proceed to step 114, in which event electric motor/generator 4 is operated as a generator driven by mechanical linkage to the wheels 5 to produce electricity for storage in battery 3, which will provide braking power to meet the vehicle braking demand. It should be noted that friction braking may also be used together with the electric regenerative braking to avoid very high charge rates that could damage the battery pack 3. Likewise, in the event it is determined that the battery pack 3 has become full and is no longer available for energy storage, the vehicle will then switch to friction braking (step 113) to meet the braking demand (e.g., by proceeding directly to step 113 or by returning to step 111 for a re-determination that will result in proceeding to step 113).

Finally, in the event it is determined in step 111 that there is available capacity for energy storage in both the high pressure accumulator 10 and in battery pack 3, then the regenerative braking system will preferably proceed in step 115 to concurrently regenerate both the hydraulic and electric systems per the depiction of FIG. 4A. In this event, motor/generator 4 will operate as a generator to charge battery pack 3 at an "optimal" charge rate (as defined above) for battery charging efficiency, while pump/motor 9 will at the same time operate as a pump (thereby recharging high pressure accumulator 10) to provide whatever additional regenerative braking may be required to meet the overall vehicle braking demand. If it is determined in the course of the braking event that either the battery pack 3 or the high pressure accumulator 10 has become full and is no longer available for additional energy storage, then the control system returns to step 111 to determine how to conduct the continued braking required. Alternatively, the system could be made to proceed in such event directly to friction braking.

In other embodiments (e.g., as shown in FIG. 4B), energy storage for the vehicle may be performed solely by the hydraulic energy storage system as long as there is hydraulic energy storage capacity available, regardless of electric energy storage capacity, in order to simplify braking control and maximize the use of the higher efficiency hydraulic regenerative braking. This could make particular sense in applications where there is enough space available on board the vehicle for hydraulic accumulators of sufficient capacity to be able to fully handle the anticipated braking needs for the vehicle (i.e., thus there is little likelihood of frequently needing to resort to friction braking or to charging the battery at high and inefficient charge rates as a result of the accumulators reaching maximum capacity during vehicle operation and thus being unable to handle all braking demands).

It may be noted that opportunities for regenerative braking may also exist under certain conditions even if the brake pedal is not depressed, such as in the event of avoiding acceleration during downhill coasting under a vehicle speed control system.

It will be understood that various modifications and variations could be made using the ideas of the present invention. Therefore, the scope of the present invention is limited only as specified in the appended claims.

I claim:

1. A method of operating a hybrid motor vehicle, comprising:
   in the event of a vehicle braking demand to slow a moving hybrid motor vehicle:
   (i) using a portion of kinetic energy of the moving vehicle to drive an electric motor/generator as a generator to produce electrical energy for storage in an electric storage battery at a rate selected to result in an optimally efficient charging rate for the battery, thereby providing a first quantum of braking power for the vehicle that is less than the total braking power necessary to meet the vehicle braking demand; and
   (ii) concurrently using a second portion of kinetic energy of the moving vehicle to drive a hydraulic pump to pressurize fluid for storage in a hydraulic accumulator, thereby providing a second quantum of braking power for the vehicle at whatever rate is necessary to collectively satisfy the vehicle braking demand.

* * * * *